United States Patent [19]
Rich et al.

[11] Patent Number: 5,698,785
[45] Date of Patent: Dec. 16, 1997

[54] SELF-COMPENSATING ACCELEROMETER

[75] Inventors: David Boyd Rich, Indianapolis; William James Cleaver, Kokomo; Gregory Donald Swanson, Indianapolis; Mark Billings Kearney, Kokomo, all of Ind.

[73] Assignee: Delco Electronics Corporation, Kokomo, Ind.

[21] Appl. No.: 693,564

[22] Filed: Aug. 7, 1996

Related U.S. Application Data

[63] Continuation of Ser. No. 416,235, Apr. 4, 1995, abandoned.

[51] Int. Cl.$^6$ ........................................... G01P 15/12
[52] U.S. Cl. ..................... 73/514.33; 73/497; 338/3; 257/419
[58] Field of Search .................. 73/514.33, 514.36, 73/514.16, 497; 338/2, 3, 46; 257/419, 417

[56] References Cited

U.S. PATENT DOCUMENTS

| | | | |
|---|---|---|---|
| 4,553,436 | 11/1985 | Hansson | 73/514.33 |
| 4,836,025 | 6/1989 | Mihara | 73/514.33 |
| 4,869,107 | 9/1989 | Murakami | 73/514.33 |
| 4,990,986 | 2/1991 | Murakami et al. | 357/26 |
| 5,081,867 | 1/1992 | Yamada | 73/514.33 |

FOREIGN PATENT DOCUMENTS

| 470003 | 2/1992 | European Pat. Off. | 73/514.33 |
|---|---|---|---|

*Primary Examiner*—Hezron E. Williams
*Assistant Examiner*—Helen C. Kwok
*Attorney, Agent, or Firm*—Jimmy L. Funke

[57] ABSTRACT

A motion sensor for sensing motion or acceleration of a body, such as the type used in onboard automotive and aerospace safety control system, navigational system or active suspension control system. The motion sensor includes a support frame, a bridge projecting from the support frame, and a proof mass suspended from the support frame by the bridge so as to enable the proof mass to respond to an input force imposed on the motion sensor. The bridge is provided with a strain sensing element that generates an acceleration signal in response to a deflection of the proof mass. The motion sensor further includes a structural feature capable of compensating for mechanically and thermally induced strains imposed on the motion sensor by generating a compensation signal in response to such strains. Finally, the sensor includes circuitry for detecting the acceleration and compensation signals and canceling the compensation signal from the acceleration signal, so as to produce an output signal that more closely corresponds to the input force on the proof mass than does the acceleration signal.

8 Claims, 1 Drawing Sheet

U.S. Patent     Dec. 16, 1997     5,698,785
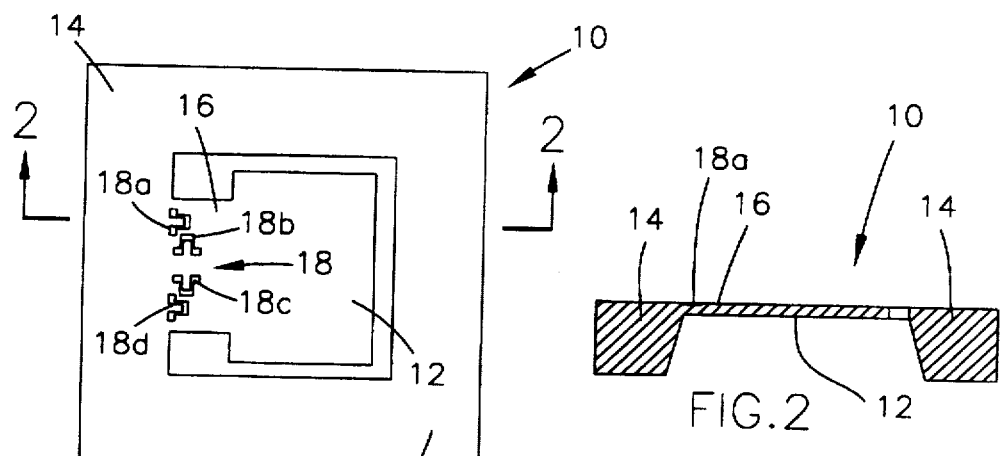
FIG.1 PRIOR ART
FIG.2
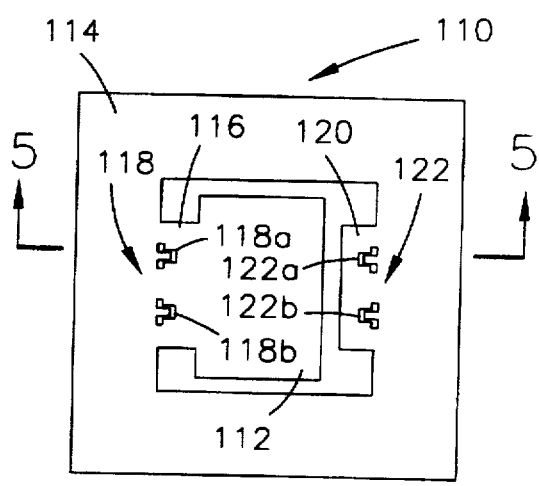
FIG.4
FIG.5
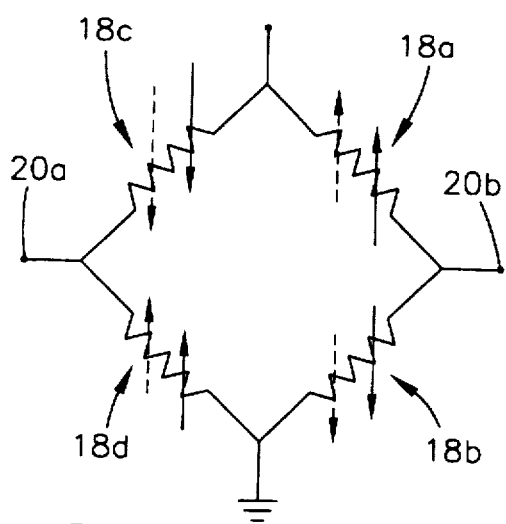
FIG.3 PRIOR ART
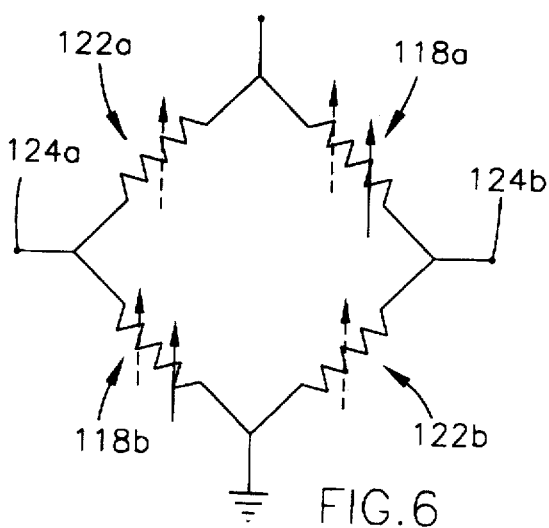
FIG.6

SELF-COMPENSATING ACCELEROMETER

This is a continuation of application Ser. No. 08/416,235 filed on Apr. 4, 1995 now abandoned.

This invention generally relates to motion sensors, and particularly those which sense acceleration through detecting a deflection of a proof mass. More specifically, this invention relates to an accelerometer that is configured to include a compensating structure that specifically serves to sense unwanted signals caused by mechanically and thermally induced strains within the accelerometer package, such that such unwanted signals can be cancelled in order to more faithfully detect the acceleration forces imposed on the accelerometer.

BACKGROUND OF THE INVENTION

Motion sensors and accelerometers are widely used in aerospace and automotive safety control systems and navigational systems, such as crash sensing systems. Examples of automotive applications include anti-lock braking systems, active suspension control systems, supplemental inflatable restraint systems such as air bags, and seat belt lock-up systems. An example of a type of motion sensor employed in automotive systems is an acceleration sensor, or accelerometer, which senses acceleration, or more accurately, a force resulting from a change in the velocity of the vehicle. As with many motion sensors, an accelerometer operates on the basis of a moving body possessing inertia which tends to resist a change in velocity.

In the past, electromechanical and electronic accelerometers have been widely used in the automotive industry to detect an automobile's deceleration. One such accelerometer 10 is illustrated in FIGS. 1 and 2. As illustrated, the accelerometer 10 is a bulk-micromachined, piezoresistive accelerometer having a cantilevered proof mass 12. The proof mass 12 is connected to a surrounding frame 14 with a bridge 16. The proof mass 12, frame 14 and bridge 16 can be bulk-micromachined from the same piece of single crystal silicon using a conventional chemical etching technique. As seen in FIG. 2, the proof mass 12 has the same thickness as the bridge 16, though the proof mass 12 could be micromachined to have any suitable thickness, up to and including the thickness of the frame 14.

As is conventional, a strain sensing device, such as the implanted piezoresistors 18 shown in FIG. 1, is formed in or on the bridge 16. Piezoresistors 18 are widely employed for accelerators that are bulk-micromachined from a silicon chip due to their precision, their ability to utilize the anisotropic piezoresistive characteristic of silicon, and their processing compatibility with integrated circuit processing techniques. The shape and dopant for the piezoresistors 18, as well as their orientation to the crystal axis, are chosen such that when a mechanical strain is applied to the crystal in the location of the piezoresistors 18, the value of their resistances will change.

Using conventional integrated circuit processing methods, the piezoresistors 18 shown in FIG. 1, individually identified as resistors 18a, 18b, 18c and 18d, can be connected to suitable circuitry for producing an output signal that is proportional to a force imposed on the proof mass 12. Known circuitry for this purpose include a Wheatstone bridge circuit, which is schematically represented in FIG. 3. In operation, when the accelerometer is subject to an acceleration force in a direction perpendicular to the plane of the frame 14, the proof mass 12 will deflect relative to the frame 14, causing the bridge 16 to bend. As a result, one surface of the bridge 16 will be in tension, while the opposite surface will be in compression. Because of the piezoresistive effect of the silicon crystal, the value of the resistances of the resistors 18a through 18d will change, as represented by the solid arrows in FIG. 3. By connecting the resistors 18a through 18d to the Wheatstone bridge circuit as shown in FIG. 3, a voltage difference between terminals 20a and 20b will result. This voltage difference is proportional to the applied acceleration force to which the proof mass 12 is subjected. For example, if the proof mass 12 is directed downward from its null position shown in FIG. 1, the resistors 18a and 18d will exhibit an increase in their resistance values, while a decrease will occur in the resistance values for the resistors 18b and 18c.

Accelerometers and signal processing circuitry of the type illustrated in FIGS. 1 through 3 are known and employed in the automotive industry. However, such sensors have a significant operational shortcoming, in that influences other than acceleration can cause strain in the location of the piezoresistors 18, resulting in an error in the acceleration measurement. Such influences can come from a wide variety or sources, including external loads such as those induced during packaging, dimensional changes in the sensor package caused by temperature changes, and strains caused by mismatches in thermal coefficients of expansion between the silicon bridge 16 and thin passivation films employed to protect the piezoresistors 18. Regardless of their sources, these extrinsic strains have the potential of changing the resistance values of the piezoresistors 18, as represented by the dashed arrows in FIG. 3, which in turn causes a voltage difference at the output terminals 20a and 20b of the signal processing circuitry. The voltage difference due to extrinsic strains cannot be distinguished from the voltage difference that results solely from an acceleration force imposed on the proof mass 12. Unless the extrinsic signal is compensated for by signal conditioning circuitry, the result is an error that will degrade the accuracy of the desired acceleration measurement. However, since such extrinsic signals cannot be readily predicted, it is not typically possible to completely compensate for all signal errors. Furthermore, compensating circuitry of this type can add complexity to the sensor's signal conditioning circuitry.

Therefore, what is needed is a motion sensor that is self-compensating in terms of identifying and cancelling extrinsic signals from the output of the sensor, such that an output signal is produced that more closely corresponds to acceleration forces imposed on the sensor's proof mass, yet without the requirement for complex signal conditioning circuitry.

SUMMARY OF THE INVENTION

It is an object of the present invention to provide a cost-efficient motion sensor that is suitable for use in automotive applications and also amenable to standard integrated circuit production techniques.

It is another object of this invention that such a motion sensor employ a proof mass that is supported from a frame such that the proof mass is free to respond to acceleration forces imposed on the motion sensor.

It is a further object of this invention that the motion sensor be configured to include a self-compensating feature that serves to detect and enable cancellation of the effect of extrinsic strains on the output signal of the motion sensor.

It is still a further object of this invention that such a motion sensor be amenable to known processing methods, yielding a motion sensor whose construction is not only able to accurately detect motion and acceleration, but also requires a minimal number of processing steps so as to facilitate its manufacture and minimize production costs.

In accordance with a preferred embodiment of this invention, these and other objects and advantages are accomplished as follows.

A motion sensor is provided for sensing motion or acceleration of a body, such as an accelerometer for use in an on-board automotive safety control system, navigational system or active suspension control system. The motion sensor includes a support frame, a bridge projecting from the support frame, and a proof mass suspended from the support frame by the bridge so as to enable the proof mass to respond to an input force imposed on the motion sensor. The bridge is provided with a strain sensing element, such as one or more piezoresistors, that is capable of yielding an output, hereinafter an "acceleration signal", in response to a deflection of the proof mass.

In accordance with this invention, the motion sensor further includes a feature capable of compensating for mechanically and thermally induced strains imposed on the motion sensor. More specifically, the compensating feature is capable of yielding an output, hereinafter a "compensation signal", that is essentially exclusively in response to mechanically and thermally induced strains imposed on the motion sensor. Preferably, such a feature is a structure, such as a beam, that is integrally formed with the frame, and projects from the frame in a cantilevered manner. In order to detect mechanically and thermally induced strains in the structure, the structure further includes a strain sensing element capable of generating the compensation signal, such as one or more piezoresistors. Finally, the sensor includes circuitry for detecting the acceleration and compensation signals and cancelling the compensation signal from the acceleration signal, so as to produce an output signal that more closely corresponds to the input force on the proof mass than does the acceleration signal. Such circuitry can be a single or multiple Wheatstone bridge circuits.

As described above, the compensating feature will respond to essentially all mechanical stimuli, such as external package strains and thermally-induced internal strains, in the same way as does the bridge with which the proof mass is suspended. However, since the compensating feature is not connected to the proof mass, it has a negligible response to any applied acceleration forces on the sensor. As such, when the strain sensing elements on the bridge and compensating feature are connected to the sensor circuitry, the unwanted signal detected from the compensation feature can be cancelled from the acceleration signal, yielding an output signal that more closely corresponds to the input acceleration force on the proof mass than does the acceleration signal. As such, the motion sensor of this invention is characterized by a significantly decreased sensitivity to temperature changes, internal stresses created by sensor processing, and external packaging stresses created during sensor packaging. As a result of the latter, the motion sensor can be packaged in a less expensive plastic overmolded package while maintaining its previously noted operational advantages.

In addition to the above, the motion sensor of this invention has the further advantage of being fabricated using known integrated circuit processing techniques. A particularly advantageous configuration is that of a micromachined accelerometer, in which the support frame, proof mass, bridge and compensating feature are all bulk-micromachined from a piece of single crystal silicon. Such a motion sensor is capable of precision motion sensing and desirable frequency response characteristics.

Other objects and advantages of this invention will be better appreciated from the detailed description thereof, which follows.

BRIEF DESCRIPTION OF THE DRAWINGS

The above and other advantages of this invention will become more apparent from the following description when taken in conjunction with the accompanying drawings, in which:

FIG. 1 is a plan view of a motion sensor of a type known in the prior art;

FIG. 2 is a cross-sectional view of the motion sensor of FIG. 1 in accordance with the prior art;

FIG. 3 schematically represents a Wheatstone bridge circuit used for signal processing the output of the motion sensor of FIGS. 1 and 2;

FIG. 4 is a plan view of a motion sensor in accordance with the teachings of the present invention;

FIG. 5 is a cross-sectional view of the motion sensor of FIG. 4; and

FIG. 6 schematically represents a Wheatstone bridge circuit suitable for signal processing the output of the motion sensor of FIGS. 4 and 5.

DETAILED DESCRIPTION OF THE PREFERRED EMBODIMENTS

A motion sensor 110 in accordance with a preferred embodiment of this invention is illustrated in FIGS. 4 and 5. The external appearance and construction of the sensor 110 is similar to that of the prior art motion sensor 10 previously described with reference to FIGS. 1 and 2, with the primary difference being in the ability of the sensor 110 of this invention to self-compensate for mechanically and thermally induced strains that are imposed on or are created within the sensor package in which the sensor 110 is incorporated.

The motion sensor 110 of this invention is preferably a bulk-micromachined sensor, in which a proof mass 112, support frame 114 and bridge 116 are all bulk-micromachined from a piece of single crystal silicon, though other fabrication techniques could be used. The proof mass 112 is shown as being cantilevered into an aperture defined by the frame 114. The proof mass 112 is also depicted as having the same thickness as the bridge 116, though it could be micromachined to have a significantly greater thickness if the response characteristics of the sensor 110 require.

In a conventional manner, the bridge 116 has a pair of implanted piezoresistors 118a and 118b that are oriented so as to be able to sense strain in the bridge 116 when the proof mass 112 is deflected in a direction approximately perpendicular to the plane of the frame 114. A passivation layer (not shown) is preferably formed over the piezoresistors 118a and 118b in order to electrically shield them from the remainder of the sensor package. As illustrated, the sensor 110 is particularly configured as an accelerometer, though the sensor 110 is generally capable of sensing any motion in a direction approximately perpendicular to the plane of the sensor 110.

As noted with the prior art sensor 10 of FIGS. 1 and 2, the bridge 116 is subject to influences other than strains induced by acceleration forces on the proof mass 112. For example, the bridge 116 is subject to extrinsic strains such as external loads induced during packaging, dimensional changes in the sensor package caused by temperature changes, and strains caused by mismatches in thermal coefficients of expansion between the silicon bridge 116 and the thin passivation film over the piezoresistors 118a and 118b. Such extrinsic influences have the potential of changing the resistance values of the piezoresistors 118a and 118b, and thereby introducing an error in the output of the sensor 110.

In contrast to prior art sensors, the sensor 110 of this invention employs a unique compensating beam 120 that projects into the aperture in a cantilevered manner. As illustrated, the beam 120 has approximately the same width, length and thickness as the bridge 116, such that the beam 120 will respond to both extrinsic and intrinsic strains in substantially the same manner as the bridge 116. It is foreseeable that the configuration of the beam 120 could be other than that shown in the Figures for the purpose of selectively tailoring the strains that develop within the beam 120 in response to known or predicted influences. In addition, the beam 120 is illustrated as being oppositely disposed from the proof mass 112, such that the beam 120 is subjected to substantially the same or symmetric loads as the bridge 116. Again, this aspect of the invention could be altered in order to gain an advantage regarding the beam's response to extrinsic and intrinsic forces. The beam 120 shown in FIGS. 4 and 5 is adapted to respond to all mechanical stimuli, including the same external package strains and thermally-induced internal strains to which the bridge 116 is subjected. However, since the beam 120 is not connected to the proof mass 112, it has a negligible response to any applied acceleration forces on the sensor 110.

In order to detect the level of mechanical stresses to which the beam 120 is subjected, the beam 120 is equipped with a pair of implanted piezoresistors 122a and 122b that serve to sense any strain in the beam 120. As with the piezoresistors 118a and 118b, the piezoresistors 122a and 122b can be formed in any suitable manner known in the art, and will include a passivation layer (not shown) not only to protect the piezoresistors 122a and 122b, but also to more closely duplicate the environment of the piezoresistors 118a and 118b on the bridge 116. As the beam 120 responds to a mechanical stimuli, such as external package strains and thermally-induced internal strains, the isolated effect of such strains will be detected by the piezoresistors 122a and 122b. The signals generated by the piezoresistors 122a and 122b can then be subtracted from the signals generated by the piezoresistors 118a and 118b on the bridge 116 in order to more accurately determine the acceleration forces on the proof mass 112.

FIG. 6 illustrates a Wheatstone bridge circuit that utilizes an "acceleration signal", defined herein as being based on a change in resistance of the piezoresistors 118a and 118b, and a "compensation signal", defined herein as being based on a change in resistance of the piezoresistors 122a and 122b. Because the acceleration signal from the piezoresistors 118a and 118b is the result of a combination of acceleration forces, causing a change in resistance represented by the solid arrows, and mechanically and thermally induced forces, causing a change in resistance represented by the dashed arrows, the acceleration signal is proportional to the acceleration forces, but does not accurately indicate the level of those forces. In contrast, the compensation signal from the piezoresistors 122a and 122b is the result of only the mechanically and thermally induced forces that are extrinsic to the acceleration forces imposed on the proof mass 112, as represented by a resistance change indicated by the dashed arrows in FIG. 6. For this reason, the Wheatstone bridge circuit is used to cancel the compensation signal from the acceleration signal, so as to produce an output signal that more closely corresponds to the input force on the proof mass 112 than does the acceleration signal.

As represented, the signal processing circuitry can be a single Wheatstone bridge circuit, though multiple Wheatstone bridge circuits can be used to increase the sensitivity of the sensor 110 as will be discussed below. In a preferred embodiment, the piezoresistors 118a, 118b, 122a and 122b are connected to the Wheatstone bridge circuit as shown in FIG. 6. As such, the effect of the extrinsic strains experienced by both the bridge 116 and beam 120 is cancelled by subtracting the extrinsic strains isolated by the beam's compensation signal from the bridge's acceleration signal. The output signal measured across the terminals 124a and 124b is then attributable almost exclusively to the acceleration forces on the proof mass 112.

In operation, when the sensor 110 is subject to an acceleration force having a component that is approximately perpendicular to the plane of the frame 114, the proof mass 112 will deflect relative to the frame 114, causing the bridge 116 to bend. As a result, one surface of the bridge 116 will be in tension, while the opposite surface will be in compression. Because of the piezoresistive effect of the silicon crystal, the value of the resistances of the piezoresistors 118a and 118b will change. In contrast, the external and internal strains on the bridge 116 and the beam 120 will remain substantially constant, in that such strains are determined primarily by packaging, materials and temperature. The change in resistance of the piezoresistors 118a and 118b will cause a voltage difference between terminals 124a and 124b, but the voltage difference will not be effected by the extrinsic strains in the sensor 110 because such effects are cancelled by the circuit. Accordingly, the voltage difference across the terminals 124a and 124b will not only be proportional to the applied acceleration force to which the proof mass 112 is subjected, but will more accurately indicate the level of the acceleration force.

In accordance with this invention, because the extrinsic and intrinsic strains resulting from thermally-induced forces have been compensated for, the voltage difference across the terminals 124a and 124b of the sensor 110 yields a flat "offset" signal with respect to temperature. This offset signal is apparent as the output of the Wheatstone bridge when the sensor 110 is not subject to an acceleration force. In addition to the advantages noted above, it has been determined that the sensor 110 can be modified in order to predictably produce a sloped offset signal with respect to temperature. Such an effect is achieved by causing the shape and/or thickness of the passivation layer on the piezoresistors 118a and 118b on the bridge 116 to be different from that of the piezoresistors 122a and 122b on the beam 120. Depending on the coverage of the passivation layers and how the piezoresistors are arranged on the Wheatstone bridge, a positive or negative slope of offset can be achieved relative to temperature. Such a technique can be employed to de-couple the offset slope from the temperature sensitivity slope of the sensor 110, a capability which has not been possible in the prior art.

While the embodiment illustrated in FIG. 6 achieves the goal of cancelling the unwanted extrinsic strains from the output signal of the sensor 110, the sensitivity of the sensor 110 is roughly half that of the prior art sensor 10 of FIG. 1, since only two piezoresistors 118a and 118b are employed on the bridge 116 instead of the four employed on the bridge 16. The sensitivity of the sensor 110 can be increased by employing two complete and separate Wheatstone bridge circuits, each of which is equivalent to the circuit represented by FIG. 3. In this embodiment, one of the circuits operates on the signals of four piezoresistors on the bridge 116, while the second circuit operates on the signals of four piezoresistors on the beam 120. The voltage differences across each set of terminals 124a and 124b can then be used by appropriate signal conditioning circuitry to subtract the second circuit's signal from the first circuit's signal, thereby cancelling the error introduced by the extrinsic external and internal strains of the sensor 110. The resulting sensor has the full sensitivity of the sensor 10 of FIG. 1, combined with the strain error compensation achieved by the sensor 110 of FIG. 4.

In view of the above, it can be appreciated that a motion sensor configured in accordance with this invention has significant advantages over the sensor 10 of the prior art. Most notably, the sensor of this invention is configured to more faithfully produce an output proportional to the acceleration forces imposed on a proof mass. Specifically, the compensation beam 120 taught by this invention is configured to respond to essentially all mechanical stimuli, such as external package strains and thermally-induced internal strains, in the same way as does the bridge 116. However, since the beam 120 is not connected to the proof mass, it has a negligible response to any applied acceleration forces on the sensor. As such, when strain sensing elements on the bridge 116 and strain sensing elements on the beam 120 are connected to an appropriate processing circuitry, the unwanted compensation signal detected from the beam 120 is cancelled from the acceleration signal detected from the bridge 116, yielding an output signal that more closely corresponds to the input acceleration force on the proof mass than does the acceleration signal.

As such, the motion sensor of this invention is characterized by a significantly decreased sensitivity to temperature changes, internal stresses created by sensor processing, and external packaging stresses created during sensor packaging. As a result of the latter, the motion sensor can be packaged in less expensive plastic overmolded packages while maintaining the previously noted operational advantages.

Another significant advantage of the present invention is that the motion sensor can be fabricated using known integrated circuit processing techniques. As described above, the support frame 114, proof mass 112, bridge 116 and beam 120 can all be bulk-micromachined from a piece of single crystal silicon. Such a motion sensor is capable of precision motion sensing and desirable frequency response characteristics.

While our invention has been described in terms of a preferred embodiment, it is apparent that other forms of the device could be adopted by one skilled in the art. For example, other transduction methods could be used to sense the strain in the bridge 116 and the beam 120, including resonating beam, tunneling tip, capacitive and piezoresistive shear strain sensors, all of which are strain sensing elements known in the art. Furthermore, those skilled in the art will appreciate that the sensor of this invention and its method for fabrication are equally applicable to other sensor configurations and other motion sensing applications. Accordingly, the scope of our invention is to be limited only by the following claims.

The embodiments of this invention in which an exclusive property or privilege is claimed are defined as follows:

1. An accelerometer comprising:

a support frame defining an aperture and a plane;

a bridge projecting from the support frame into the aperture, the bridge having a width, a length transverse to the width, and a thickness normal to the plane of the support frame;

a proof mass cantilevered within the aperture by the bridge so as to enable the proof mass to respond to forces in a direction perpendicular to the plane of the support frame, the proof mass having a proximal end adjoining the bridge and an oppositely-disposed distal end;

first means for sensing strain in the bridge so as to generate an acceleration signal in response to a deflection of the proof mass;

a structure projecting from the support frame so as to be cantilevered within the aperture, the structure extending toward the proof mass from a region of the support frame that is opposite the bridge relative to the proof mass, the structure having a distal end adjacent the distal end of the proof mass so as to form a gap therebetween and so that the proof mass is between the bridge and the structure, the structure being subject to mechanically and thermally induced strains imposed on the accelerometer, the structure having a width, length, and thickness approximately equal to the width, length and thickness, respectively, of the bridge;

second means for sensing strain in the structure so as to generate a compensation signal therefrom; and means for detecting the acceleration and compensation signals and canceling the compensation signal from the acceleration signal so as to produce an output signal that more closely corresponds to the forces on the proof mass than does the acceleration signal.

2. An accelerometer as recited in claim 1 further comprising a first passivation layer over the first sensing means and a second passivation layer over the second sensing means, the first passivation layer differing from that of the second passivation layer so to alter the slope of the output signal relative to temperature.

3. An accelerometer as recited in claim 1 wherein the detecting means comprises a first Wheatstone bridge circuit coupled to the first sensing means, a second Wheatstone bridge circuit coupled to the second sensing means, and a signal conditioning means for canceling the compensation signal from the acceleration signal so as to produce the output signal.

4. An accelerometer as recited in claim 1 wherein the accelerometer is a bulk-micromachined accelerometer, such that the support frame, the bridge, the proof mass and the structure are formed from a piece of single crystal silicon.

5. In an accelerometer having a support frame defining an aperture and a plane, a bridge projecting from the support frame into the aperture, a proof mass cantilevered within the aperture by the bridge so as to enable the proof mass to respond to forces in a direction perpendicular to the plane of the support frame, the proof mass having a proximal end adjoining the bridge and an oppositely-disposed distal end, and a first set of piezoresistors formed on the bridge for sensing strain in the bridge and generating an acceleration signal in response to a deflection of the proof mass, wherein an improvement comprises:

a structure cantilevered into the aperture from the support frame so as to extend toward the proof mass from a region of the support frame that is opposite the bridge relative to the proof mass, the structure having a distal end adjacent the distal end of the proof mass so as to form a gap therebetween and so that the proof mass is between the bridge and the structure, the structure having approximately the same width, length and thickness as the bridge such that the accelerometer has an axis of symmetry through the bridge, the proof mass and the structure, the structure being subject to mechanically and thermally induced strains imposed on the accelerometer;

a second set of piezoresistors formed on the structure for sensing strain in the structure and generating a compensation signal therefrom; and means for detecting the acceleration and compensation signals and canceling the compensation signal from the acceleration signal so as to produce an output signal that more closely corresponds to the forces on the proof mass than does the acceleration signal.

6. An accelerometer as recited in claim 5 wherein the detecting means comprises a Wheatstone bridge circuit.

7. An accelerometer as recited in claim 5 wherein the detecting means comprises a first Wheatstone bridge circuit coupled to the first set of piezoresistors, a second Wheatstone bridge circuit coupled to the second set of piezoresistors, and a signal conditioning means for canceling the compensation signal from the acceleration signal so as to produce the output signal.

8. An accelerometer as recited in claim 5 further comprising a first passivation layer over the first set of piezoresistors and a second passivation layer over the second set of piezoresistors, the first passivation layer differing from that of the second passivation layer so as to alter the slope of the output signal relative to temperature.

* * * * *